Figure 1:
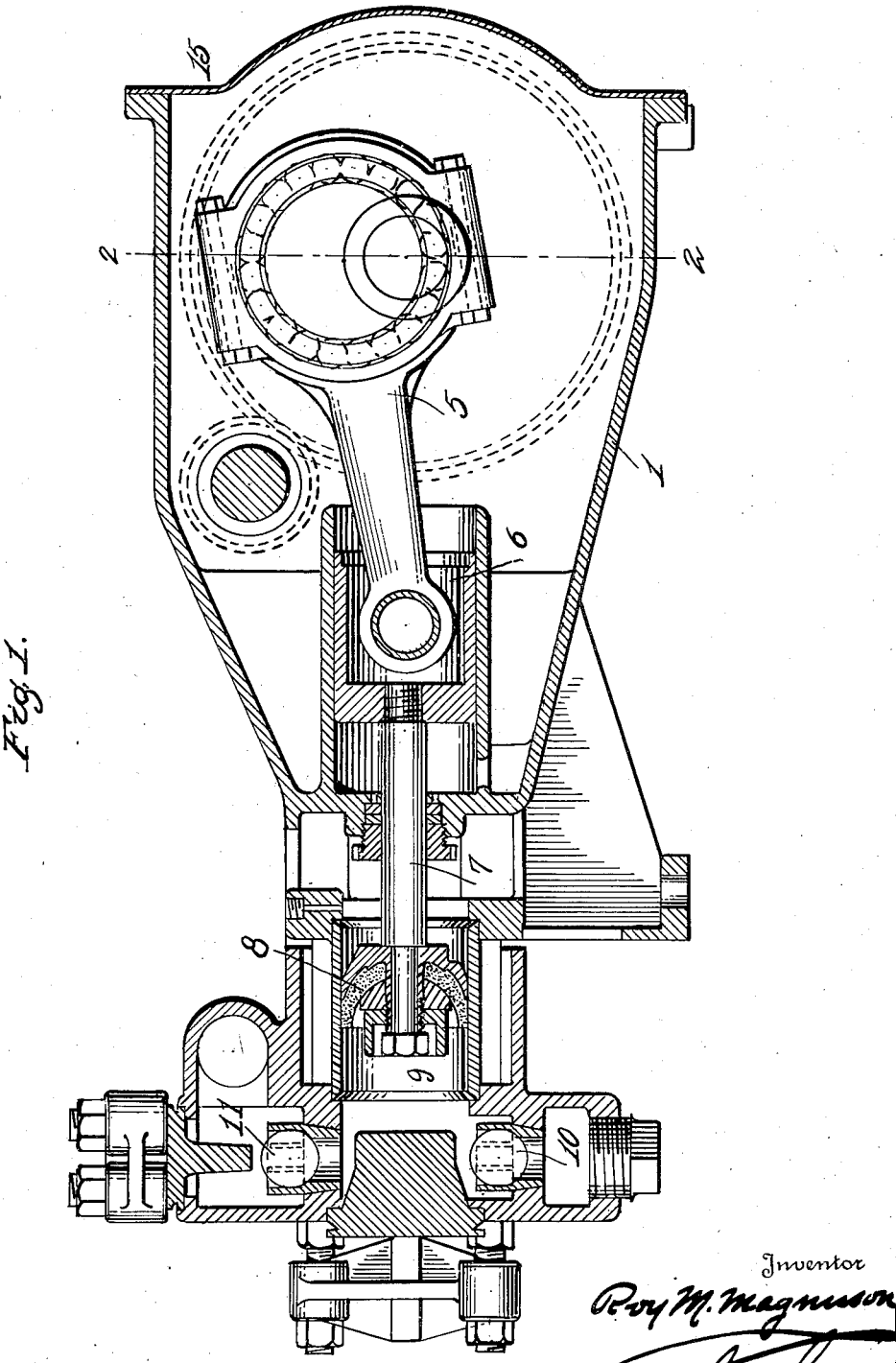

April 28, 1936. R. M. MAGNUSON 2,038,747
SPRAY PUMP
Filed Dec. 8, 1933 2 Sheets-Sheet 1

Inventor
Roy M. Magnuson
By
J. W. Graham
Attorney

April 28, 1936. R. M. MAGNUSON 2,038,747
SPRAY PUMP
Filed Dec. 8, 1933 2 Sheets-Sheet 2
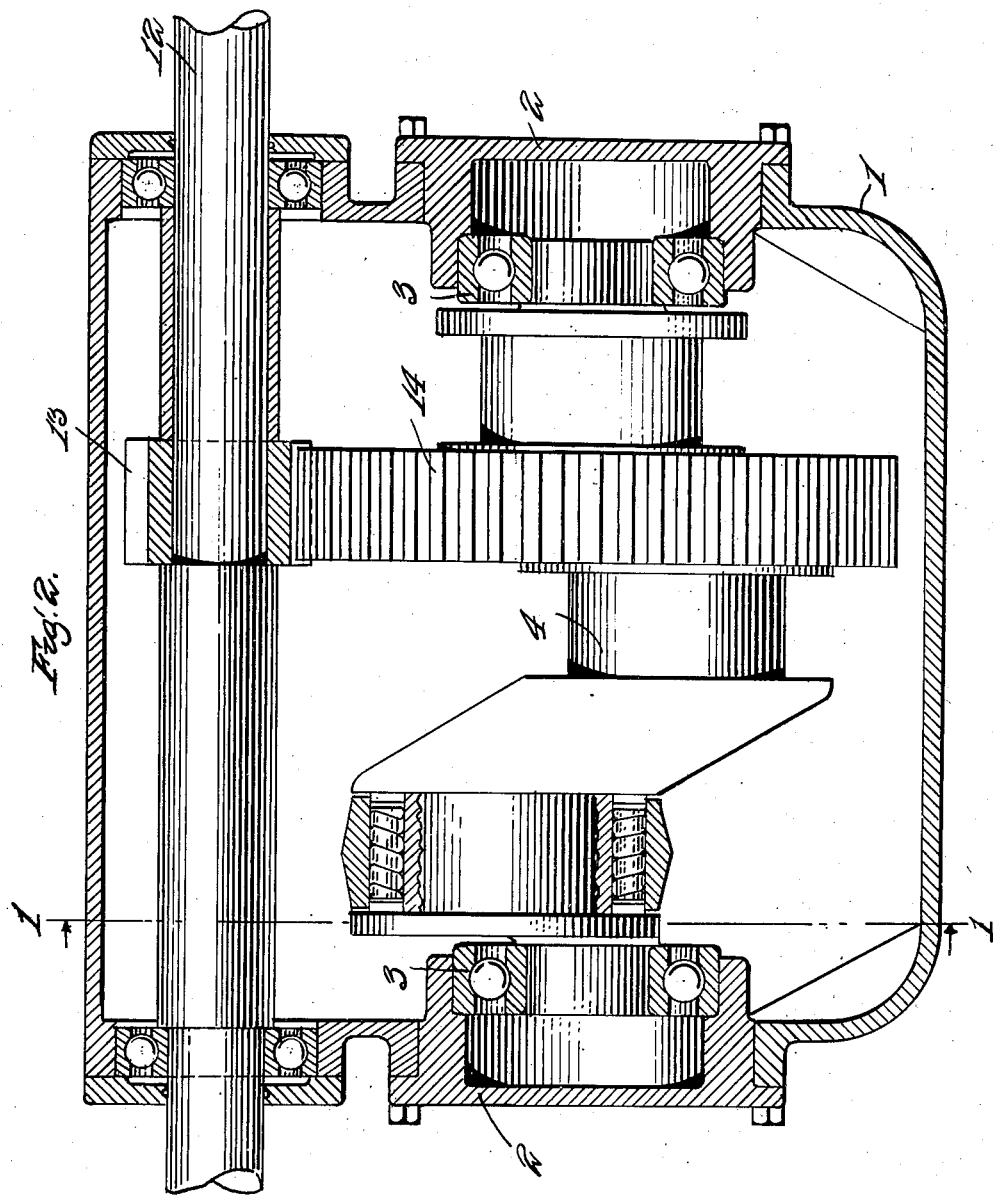
Inventor
Roy M. Magnuson
By A. D. Graham
Attorney Patented Apr. 28, 1936

2,038,747

UNITED STATES PATENT OFFICE 2,038,747

SPRAY PUMP

Roy M. Magnuson, San Jose, Calif., assignor to Food Machinery Corporation, San Jose, Calif., a corporation of Delaware Application December 8, 1933, Serial No. 701,557

1 Claim. (Cl. 74—606)

This invention relates to a machine frame and particularly to a construction wherein certain operative parts may be removed without disconnection and thus greatly facilitate the making of repairs or replacements.

The invention is shown as applied to a spray pump but it is quite evident that it is applicable to any machine frame or housing carrying operative elements which it is necessary to remove or replace at intervals.

As applied to a spray pump having a crank shaft, connecting rods and pistons, the mounting for the crank shaft is such that the end bearings may be removed and the piston released when the crank shaft assembly including the piston may be removed endwise without disassembling any of the elements.

This novel feature of construction is made possible through making the crank shaft shorter than the inside dimensions of the housing or frame member of the pump, and having removable cap bearings that extend into the housing to support the crank shaft.

This manner of assembling the operative parts of a spray pump eliminates the necessity of some fine machine work and permits the use of just ordinary surfaces to enclose the crank housing to keep in any oil splashing, or dirt and dust from entering.

It is a principal object of the invention to provide a machine housing and means for mounting a crank shaft therein in a manner to permit the removal of the crank shaft and piston assembly from the housing without disconnecting the parts.

It is a further object of the invention to provide a machine housing and means for mounting a crank shaft therein so that when the supporting bearings for the crank shaft have been removed the crank shaft may be removed in a direction at right angles to its axis.

It is also an object of the invention to provide a machine frame and means for mounting a crank shaft therein and removal therefrom in a manner to eliminate much expensive machine work and fitting to assemble the machine parts.

With such objects in view as well as other advantages which may be inherent in the invention, consisting of the parts and combinations hereinafter set forth and claimed, it is understood that the several necessary elements and combinations may be varied in their proportions, placement and general arrangement without departing from the scope and nature of the invention, and in order to make the invention more clearly understood, there are shown, somewhat diagrammatically, in the accompanying drawings means and mechanism for placing the same in concrete form, without limiting the improvements in their application to the particular construction shown.

Figure 1 of the drawings represents a side vertical elevation in section taken on substantially the line 1—1 of Figure 2, but showing the gear pair in dotted lines.

Figure 2 is a cross sectional elevation taken on substantially the line 2—2 of Fig. 1, but leaving the gear pair and part of the crank shaft in full lines.

The numeral 1 represents a housing or machine frame. 2 are cup shaped bearings bolted to the sides of the housing and carry inwardly extending hubs in which are mounted the ball bearings 3. 4 is the crank shaft and it will be seen that its overall length is less than the inside width of the housing in which it is mounted.

The crank shaft in this instance carries the connecting rods 5 connected to the pistons 6, which carry the rods 7, which in turn carry the compression cup and parts 8, moving in the compression cylinders 9. Inlet and outlet valves 10 and 11 are positioned adjacent the ends of the cylinders 9. The compression end of the machine includes the parts generally indicated by 8, 9, 10, and 11.

The shaft 12 is a drive shaft and may be connected to any suitable power source. The pinion 13 meshing with the gear 14 serves to impart rotary motion to the crank shaft 4.

The construction of a machine frame as shown requires the minimum of machine work to fit the parts. It is only necessary to finish and bore at the places for the bearing caps 2, and finish the bores for the bearings on the shaft 12 and the frame is ready to mount the crank shaft and drive shaft. The open end of the frame 1 may be conveniently closed with a thin sheet metal covering as at 15. This covering, however, does not necessarily have to be on a finished seat.

Heretofore in constructing machine frames and the like carrying crank shaft assemblies it has been necessary to disassemble the crank shaft from its attendant parts before it could be removed.

In order to remove the crank shaft from this assembly it is only necessary to remove the cup shaped bearings 2, disconnect the rods 7 from the pistons 6, or leave the rods connected to the pistons but instead remove the compression heads 8 when the entire crank shaft assembly including the large gear 14, the connecting rods 5, the pistons 6 and the rods 7 may be drawn intact from the end of the frame 1 through the opening covered by the plate 15. Of course the entire assembly may be replaced in the same manner.

One of the principal advantages of this arrangement is that the complete crank shaft assembly may be mounted out in the open where perfect freedom of access is possible and the parts fitted to the desired degree of accuracy before they are placed into the frame, then the mere placing of the cup shaped bearings 2 onto the frame and bolting them into position automatically lines up the crank shaft and parts without any fussing with shims or split boxes etc. This is a very great advantage, especially with spray pump equipment, because these pumps are sometimes operated out in the fields and orchards and are subject to very rough usage and consequently frequently require attention and replacements, and by the assembly shown the repairs or replacements may be made in the minimum of time and at the minimum of expense.

In this industry the construction disclosed herein has proven very satisfactory to the operators on account of the extreme ease of operation, repairs and examination and adjustment.

What I claim as new and desire to secure by Letters Patent is:

In a pump, a housing having longitudinal openings at each end and aligned transverse apertures, closure members for said longitudinal openings, cup shaped supports mounted in said transverse apertures and extending within the housing, cross heads reciprocatory in said housing, compression plunger means in said housing attached to said cross heads, a shaft having a driving gear and supported in said housing and means for transmitting power from said shaft to said cross heads comprising a shaft having crank pins, a gear on said shaft intermediate the crank pins and meshing with said driving gear, the ends of said crank shaft being mounted within the cup shaped supports, and connecting rods mounted on said crank shaft and pivoted to said cross heads, the said crank shaft being of a length substantially less than the width of said housing whereby upon removal of one of said closure members and both of said cup shaped supports, the means for transmitting power and the cross heads may be removed as a unit from said housing through the end opening by a direct lineal movement.

ROY M. MAGNUSON.